United States Patent [19]

Wen et al.

[11] Patent Number: 5,236,679
[45] Date of Patent: Aug. 17, 1993

[54] REMOVAL OF ALUMINUM CONTAMINATION DURING PRODUCTION OF PHOSPHORIC ACID

[75] Inventors: John W. Wen, Baton Rouge; Charles W. Weston, Prairieville, both of La.

[73] Assignee: Freeport-McMoRan Resource Partners, New Orleans, La.

[21] Appl. No.: 879,254

[22] Filed: May 6, 1992

[51] Int. Cl.$^5$ ............................................. C01B 25/16
[52] U.S. Cl. .................... 423/320; 423/116; 423/157.4; 423/321.1; 423/465
[58] Field of Search ............ 423/320, 116, 157.4, 423/465, 321 R

[56] References Cited

U.S. PATENT DOCUMENTS

| | | | |
|---|---|---|---|
| 2,954,287 | 9/1960 | Carothers et al. | 71/40 |
| 3,493,336 | 2/1970 | Milling | 423/320 |
| 3,562,769 | 2/1971 | Sugahara et al. | 423/320 |
| 4,026,990 | 5/1977 | Czysch et al. | 423/320 |
| 4,055,626 | 10/1977 | Drechsel et al. | 423/320 |
| 4,110,422 | 8/1978 | Hill | 423/317 |
| 4,136,151 | 1/1979 | Beaumont et al. | 423/167 |
| 4,136,199 | 1/1979 | Mills | 423/321 R |
| 4,164,550 | 8/1979 | Hill | 423/321 R |
| 4,248,846 | 2/1981 | Hill | 423/317 |
| 4,279,877 | 7/1981 | Hill et al. | 423/321 R |
| 4,293,311 | 10/1981 | Hill | 23/301 |
| 4,299,804 | 11/1981 | Parks et al. | 423/321 R |
| 4,379,776 | 4/1983 | Beer et al. | 423/321 R |
| 4,435,372 | 3/1984 | Frazier et al. | 423/321 R |
| 4,710,366 | 12/1987 | Astley et al. | 423/321 R |

FOREIGN PATENT DOCUMENTS 1278247 6/1972 United Kingdom ............... 423/320

*Primary Examiner*—Wayne Langel
*Attorney, Agent, or Firm*—Fisher, Christen & Sabol

[57] ABSTRACT

This invention provides a method for removing aluminum contamination from phosphoric acid during the acidulation of phosphate rock with sulfuric acid in the presence of recycled phosphoric acid. The method of this invention involves the addition of acid soluble silica to the acidulation slurry and calls for maintaining the molar ratio of non-fluosilicate fluoride (i.e. fluoride not complexed with silica) to aluminum in the liquid phase of the acidulation slurry between 2.5 and 5.0. These conditions favor the precipitation of aluminum as calcium tetrafluoaluminate dihydrate and enable the co-removal of this compound by filtration with by-product gypsum. This invention is particularily suitable for the processing of phosphate rocks with high iron and aluminum contents, such as the nonsedimentary phosphate rocks occurring in Sri Lanka.

23 Claims, 2 Drawing Sheets

REMOVAL OF ALUMINUM CONTAMINATION DURING PRODUCTION OF PHOSPHORIC ACID

FIELD OF THE INVENTION

This invention relates to a method for removing aluminum contamination from phosphoric acid during the production of phosphoric acid by the dihydrate process. More particularly, a process is disclosed for the acidulation of phosphate rock with sulfuric acid under conditions which favor the precipitation of aluminum principally as $Ca(AlF_4)_2 \cdot 2H_2O$ and the co-removal of this compound with by-product calcium sulfate dihydrate (gypsum). The process of this invention is particularily suitable for the processing of phosphate rocks with high iron and aluminum contents and with low magnesium and silica contents, such as the nonsedimentary rocks found in Sri Lanka.

BACKGROUND OF THE INVENTION

Phosphoric acid is a very versatile product finding its way into diverse industries. By far the largest market for phosphoric acid is in the fertilizer industry where this acid is neutralized with ammonia to provide a rich source of nitrogen and phosphorous readily assimilable by food crops. Nitrogen and phosphorous have important nutritional values, the most notable perhaps being as structural components of nucleic acid. Accordingly, providing an adequate supply of nitrogen to food crops facilitates cell multiplication, and thus plant growth.

It is important that phosphoric acid used in fertilizer production not be contaminated with excessive concentrations of metal-containing compounds, notably iron and aluminum compounds. Excessive concentrations of such compounds can make it impossible to meet commercial grade specifications for the ammonium phosphate produced from the phosphoric acid. Also, iron and aluminum compounds tend to precipitate slowly from phosphoric acid in the form of unfilterable sludges, which have a tendency to settle in storage tanks and rail cars and thereby interfere with the storage and transportation of the acid, and with its ultimate use in fertilizer production. The presence of high levels of aluminum is particularly deleterious; unlike iron, aluminum has no nutrient value, and in fact can be toxic to plants and inhibit root growth in acid soils.

The iron and aluminum content of wet process acid is derived from the phosphate rock from which said acid is produced. Phosphoric acid produced using currently available technology from phosphate rocks with unusually high iron and aluminum contents, such as the nonsedimentary rocks found in Sri Lanka, has a $(Fe_2O_3+Al_2O_3)/P_2O_5$ weight ratio in excess of 0.085 and is therefore not suitable for fertilizer production.

Most phosphoric acid is currently produced from sedimentary phosphate rock mined in Florida and in Morocco; the predominant technology used in phosphoric acid production is a wet process in which calcium sulfate dihydrate (gypsum) is generated as a by-product. This process is usually referred to as the dihydrate process. In this process ground phosphate ore, commonly referred to in the phosphoric acid industry as phosphate rock, is reacted with sulfuric acid in the presence of recycled dilute phosphoric acid. The slurry resulting from the chemical reaction between phosphate rock and sulfuric acid comprises orthophosphoric acid (commonly known in the industry as phosphoric acid or as wet process phosphoric acid), gypsum, and numerous suspended and dissolved impurities. The slurry is filtered to remove most of the gypsum and other suspended impurities. The resulting filtrate usually contains between 25 and 32% by weight $P_2O_5$, between about 1 and 8% by weight gypsum and other suspended impurities which are not removed by filtering, and dissolved impurities, including the aforementioned iron and aluminum compounds. This dilute wet process phosphoric acid is usually concentrated in multiple stage evaporators to a $P_2O_5$ content between about 45% to 55% prior to further storage and eventual shipment and/or conversion to ammoniated products.

The problems encountered in the industry as a result of phosphate rock - derived impurities reporting to the phosphoric acid are well known. First and foremost, the metal impurity content of the wet process acid must be sufficiently low, so that upon its ammoniation the resulting diammonium phosphate (DAP) meets the commercial grade specification, i.e. has a minimum nitrogen content of 18% and a minimum $P_2O_5$ content of 46%. Such a product is commonly referred to in the fertilizer industry as 18-46-0 DAP. Another serious problem is that of sludge formation which is attributed primarily to a phenomenon known in the industry as post- precipitation. The sludge is difficult and costly to remove from the phosphoric acid and, additionally, represents substantial losses of $P_2O_5$ values. One of the major constituents of the sludge is a complex aluminum-iron-phosphate salt, $(Al,Fe)_3KH_{14}(PO_4)_8 \cdot 4H_2O$. The sludge not only impairs the storage and transportation of wet process phosphoric acid, but its high phosphate content can result in substantial $P_2O_5$ losses. The post-precipitation phenomenon is particularly acute at the higher $P_2O_5$ concentrations attained through multiple stage evaporation of dilute wet process acid.

In the case of phosphoric acid produced from phosphate rocks having high iron and aluminum contents and low levels of magnesium, the metal impurity content of the acid may be conveniently expressed in terms of its $(Fe_2O_3+Al_2O_3)/P_2O_5$ weight ratio. Phosphoric acid derived from nonsedimentary phosphate rocks such as those found in Sri Lanka should have a $(Fe_2O_3+Al_2O_3)/P_2O_5$ weight ratio equal to or less than 0.085 in order for the acid to be suitable for the production of DAP which meets commercial specifications for nitrogen and $P_2O_5$ content.

Because of the commercial importance of wet process phosphoric acid and the adverse economic impact associated with the presence of excessive concentrations of metallic impurities in this product, a considerable technological effort has been made to develop methods for purifying wet process phosphoric acid and for reducing post-precipitation in such acid.

Settling is often employed to reduce the sludge content of wet process phosphoric acid prior to shipment. Settling of sludge solids, however, does not resolve the post-precipitation problem easily or economically because of the lengthy time required, the loss of $P_2O_5$ values associated with the sludge, and because the clarified acid may continue to exhibit a tendency for post-precipitation. Purification schemes, such as solvent extraction and ion exchange processes, have not found commercial acceptance because of excessive capital and operating costs.

Another strategy proposed in the technical literature entails chemical treatment of wet process phosphoric acid to stabilize it against post-precipitation. Examples of stabilization strategies can be found in U.S. patents issued to Richard Hill, including U.S. Pat. Nos. 4,110,422; 4,164,550; 4,248,846; 4,279,877; and 4,293,311.

U.S. Pat. Nos. 4,110,422 and 4,164,550 describe a process in which stabilized wet process phosphoric acid is produced by addition of an aluminum silicate material, such as perlite, to clarified dilute phosphoric acid, concentrating the acid, transferring it to a crystallization zone where additional clarification occurs, and then further concentrating the acid. This process is not directed toward reducing the aluminum content of the acid and may leave an excessive concentration of aluminum in the acid product.

U.S. Pat. No. 4,248,846 further incorporates a recycle stream from the crystallizer underflow to the acid train and provides for the addition of sulfuric acid to an evaporator when processing rock high in both iron and aluminum. This process also produces an acid which may be high in aluminum.

U.S. Pat. No. 4,279,877 provides a process for high-iron feed acid in which some of the iron is present in the ferrous form. The patent teaches the use of an oxidant, such as hydrogen peroxide, to oxidize all ferrous iron to the ferric state. The treatment reduces post-precipitation of the final product acid, but the final product may still be high in aluminum.

U.S. Pat. No. 4,293,311 modifies the process of U.S. Pat. No. 4,110,422 by dividing the crystallizer underflow into two streams and recycling said streams to specific points in the process. Aluminum silicate is still required and this process produces acids which may still have a high aluminum content.

More selective chemical purification schemes are also known. U.S. Pat. No. 2,954,287 to Carothers et al teaches the production of wet process acid by the addition of an alkali salt to the sulfuric acid used to attack high grade Florida phosphate rock. Impurities are advantageously precipitated, it is taught. However, the product acid may contain undesirably high concentrations of alkali metal.

U.S. Pat. No. 4,435,372 to Frazier et al describes a complex method of removing aluminum, magnesium, and fluoride impurities from wet process phosphoric acid with the calcium sulfate hemihydrate filter cake by hydrolyzing and recycling the off-gas scrubber solutions in the presence of a ferric ion catalyst. This catalytic process appears complicated and is applicable only to phosphoric acid having a $P_2O_5$ content greater than about 40%.

U.S. Pat. No. 4,136,199 to Mills describes a method of removing metal ion impurities, such as aluminum, from phosphoric acid by adding an impure sludge which contains calcium fluoride and which is obtained by treating waste pond water with lime or limestone. The process is applicable to concentrated wet process phosphoric acid having a $P_2O_5$ content of 38% to 54%. In one embodiment, the acid is mixed with a calcium fluoride-containing sludge and the resulting mixture is aged for five days, following which it is ultracentrifuged. Relatively high levels of aluminum remain in the phosphoric acid and the overall process is difficult to control because of varying compositions of the sludges used.

U.S. Pat. No. 4,379,776 to Beer et al teaches the removal of aluminum from phosphoric acid by precipitating aluminum fluorophosphate from the acid. The principal disadvantage of this approach is the loss of phosphate values with the aluminum-containing precipitate.

U.S. Pat. No. 4,299,804 to Parks et al teaches a process for precipitating magnesium and aluminum impurities from unconcentrated acids, since the high viscosity of concentrated wet process acid makes phase separation difficult. The patent teaches the addition to the filter grade wet process acid of a fluoride ion donating compound which may be hydrofluoric acid, sodium fluoride, sodium bifluoride or ammonium fluoride. Silica in the acid is taught as inhibiting or preventing precipitation of metal impurities out of solution.

U.S. Pat. No. 4,710,366 to Astley et al teaches a method for producing wet process phosphoric acid with low post-precipitation characteristics and with reduced aluminum and magnesium levels from a dilute wet process acid by mixing fluosilicic acid with said dilute wet process acid, concentrating the mixture to about 50% $P_2O_5$, subjecting it to crystallization, clarification, and further evaporation to a $P_2O_5$ content of about 60%.

None of the methods of prior art extend the utility of the conventional dihydrate wet process phosphoric acid production technology to the processing of phosphate rocks having unusually high iron and aluminum contents, such as the nonsedimentary rocks occuring in Sri Lanka. The reason for this limitation in the applicability of the prior art methods cited hereinabove lies in the fact that said methods were generally developed to control or minimize post-precipitation in wet process phosphoric acid without necessarily reducing its iron and aluminum content. Thus, while stabilizing an acid against post-precipitation, such methods do not necessarily render an acid suitable for conversion to diammonium phosphate which meets commercial grade specifications. Another disadvantage characterizing most of the prior art methods stems from the fact that these methods are generally applied to the phosphoric acid after it is produced, not while it is produced. Thus, such methods suffer from the need for additional processing steps and corresponding additional equipment and operating costs.

It is therefore an object of this invention to provide a method for removing aluminum contamination from phosphoric acid during the dihydrate process.

It is another object of this invention to provide a method for wet process phosphoric acid production from nonsedimentary phosphate rock having an unusually high iron and aluminum content, such as the igneous or metamorphic rock found in Sri Lanka, wherein said wet process phosphoric acid is suitable for conversion to diammonium phosphate which meets commercial specifications for nitrogen and $P_2O_5$ content.

It is still another object of this invention to provide an improvement to the dihydrate process in order to widen the scope of its applicability to nonsedimentary types of phosphate rocks.

SUMMARY OF THE INVENTION

This invention provides a method for removing aluminum contamination from wet process phosphoric acid during the acidulation of phosphate rock. The method of this invention involves acidulation of phosphate rock with sulfuric acid in the presence of recycled dilute phosphoric acid under conditions which favor the precipitation of aluminum as calcium tetrafluoaluminate dihydrate, $Ca(AlF_4)_2 \cdot 2H_2O$. The slurry resulting from the acidulation step is subjected to filtration which provides for the co-removal of the calcium tetrafluoaluminate salt with the by-product calcium sulfate dihydrate, $CaSO_4.2H_2O$ (gypsum) normally generated during the acidulation of phosphate rock using the so-called dihydrate process.

In accordance with this invention, conditions which favor the formation and crystallization of calcium tetrafluoaluminate dihydrate are provided by adjusting the molar ratio of non-fluosilicate fluoride to aluminum in the liquid phase of the acidulation slurry to a value between 2.5 and 5.0 using acid soluble (active) silica as an additive. Non-fluosilicate fluoride is defined as (F - 6Si), where F is the total dissolved fluoride concentration expressed in moles/liter and 6Si is the concentration of fluoride capable of being complexed by the silica content of the liquid phase of the slurry, said latter concentration expressed as a value six times greater than the silica concentration, also in moles/liter.

The method of this invention provides an improvement in the production of wet process phosphoric acid by the so-called dihydrate process. The method of this invention is particularly suitable for the processing of igneous or metamorphic phosphate rocks characterized by high $Fe_2O_3$ and $Al_2O_3$ contents, and relatively low magnesium (<0.1% MgO) and silica (<1.5% $SiO_2$) contents. Application of the conventional dihydrate process to high-metal nonsedimentary phosphate rocks, such as those found in Sri Lanka, has not been commercialized, since it would yield wet process acids with unacceptably high metal contents, i.e. with ($Fe_2O_3$ + $Al_2O_3$)/$P_2O_5$ weight ratios in excess of 0.085. The improvement provided by the method of this invention renders the dihydrate process applicable for the commercial exploitation of these important phosphate resources.

An additional benefit resulting from the introduction of acid soluble (active) silica in the acidulation of non-sedimentary rocks having a low content of acid soluble silica is the greatly reduced rate of equipment corrosion in the acidulation circuit.

Still another benefit is a significant improvement in the filtration rate of the acidulation slurry. The acidulation conditions called for by the process of this invention promote the formation of larger, easily filterable twinned or clustered gypsum crystals.

DETAILED DESCRIPTION OF THE INVENTION

Figure 1:
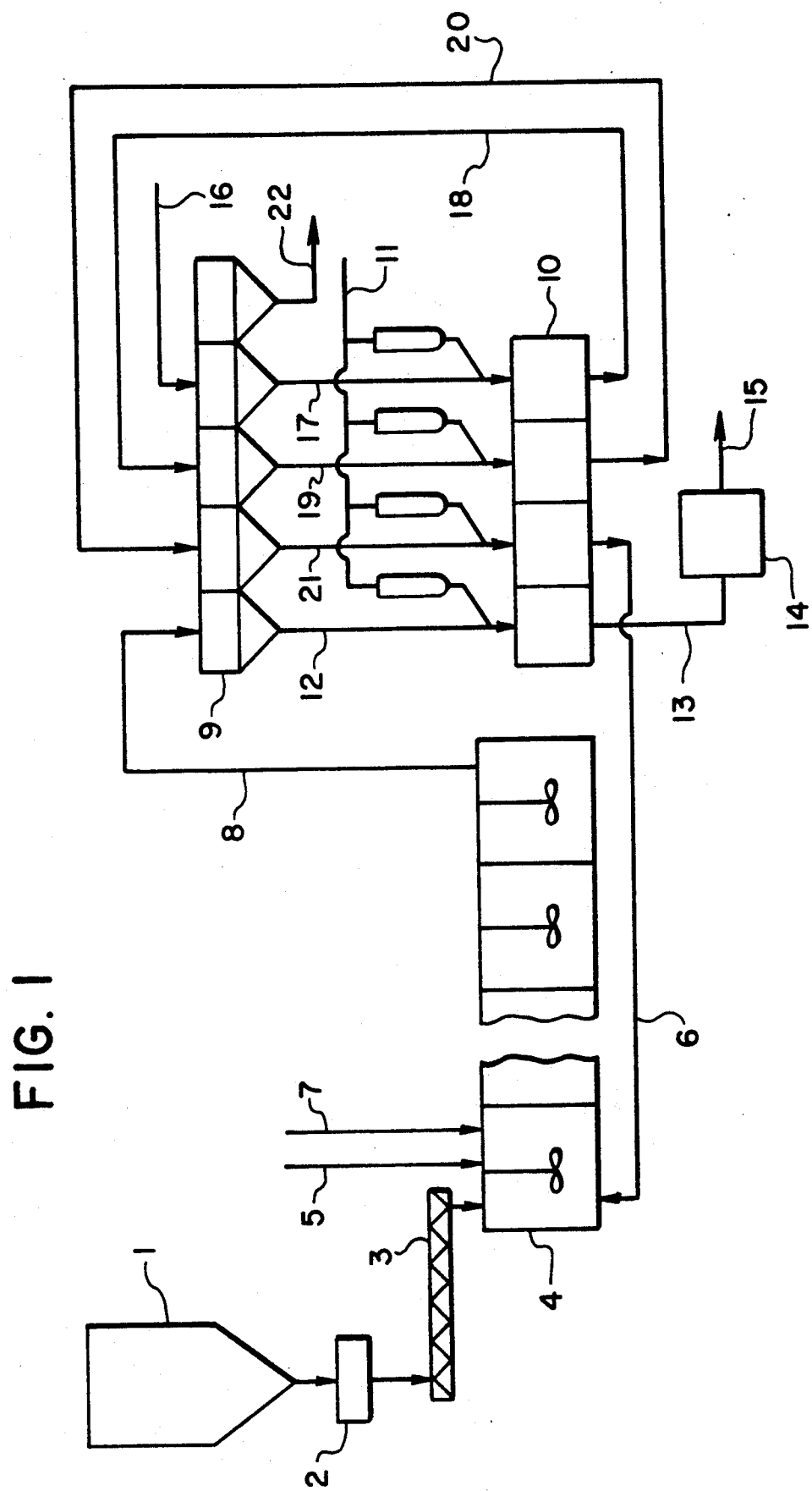
FIG. 1 is a simplified flow diagram illustrating the preferred embodiment of the invention.

The method of this invention for removing aluminum contamination from wet process phosphoric acid during the acidulation of phosphate rock will be described with reference to FIG. 1. Phosphate rock is fed from rock surge bin 1 via weigh scale 2 and screw conveyor 3 to the first in a set of attack tanks 4 in which the rock is acidulated with sulfuric acid fed to the attack tanks via line 5. This acidulation of the phosphate rock takes place in the presence of recycled phosphoric acid fed to the attack tanks via line 6. The acidulation results in the dissolution of most of the phosphate values contained in the rock, along with the partial dissolution of other components of the rock such as aluminum, iron, fluoride, and chloride, and in the crystallization of gypsum. In accordance with the process of this invention, a source of acid soluble (active) silica is added to the attack tanks via line 7 to adjust and maintain the molar ratio of non-fluosilicate flouride to aluminum in the liquid phase of the acidulation slurry to a value between about 2.5 and about 5.0. Under these conditions, the aluminum tends to crystallize, principally as calcium tetrafluoaluminate dihydrate, and thus a slurry of $Ca(AlF_4)_2.2H_2O$, and gypsum, $CaSO_4.2H_2O$, in dilute phosphoric acid is formed in the attack tanks. This slurry is transferred via line 8 to a tilting pan vacuum filter 9 operated in conjunction with a set of corresponding seal tanks 10 and vacuum system 11. The liquid phase recovered from the initial filtration step is the dilute wet process product acid containing between about 25% and 32% $P_2O_5$; this product acid is transferred via lines 12 and 13 to storage tank 14 and is further transferred via line 15 to a series of evaporators (not shown) where it is concentrated to an acid of higher $P_2O_5$ content. The filter cake is subjected to three-stage countercurrent washing using wash water supplied via line 16. The countercurrent washing serves to recover most of the $P_2O_5$ values associated with the filter cake in the form of an acid containing about 22% $P_2O_5$ which is recycled to the attack tanks via lines 21 and 6. Thus, the filtrate from washing with water is transferred via lines 17 and 18 to be used in the next washing stage, and the filtrate from that washing stage is transferred via lines 19 and 20 to be used for washing the original filter cake. As already noted, filtrate 21 is recycled via line 6 to the attack tanks; the washed filter cake 22, consisting predominantly of calcium sulfate dihydrate (gypsum) and calcium tetrafluoaluminate dihydrate, is reslurried with water and pumped to a disposal area (not shown).

The number of tanks in the set of attack tanks 4 shown in FIG. 1 may vary; the set may comprise a single tank or a series of up to 10 tanks. In the preferred embodiment of the invention a set of 9 tanks is employed. To facilitate good mixing, the tanks are equipped with agitators and baffles, and provisions are made for intense recirculation of the slurry within the set of attack tanks.

While FIG. 1 suggests that all feed streams (phosphate rock, sulfuric acid, active silica, and recycle acid) are directed into the first in the set of attack tanks, various other reactant addition arrangements are also practicable. For example, it may be preferable to feed the phosphate rock and recycle acid to the first tank, while feeding the sulfuric acid and silica to the second tank. Such an arrangement favors initial dissolution of the phosphate rock in phosphoric acid with subsequent crystallization of $CaSO_4.2H_2O$ and $Ca(AlF_4)_2.2H_2O$, and is likely to result in better $P_2O_5$ recoveries. Alternately, it may be desirable to premix the active silica with the phosphate rock or with any other feed stream.

In the practice of this invention, the slurry in the attack tanks is maintained at a temperature between about 60° and 85° C., and preferably between 70° and 80° C. The solids content of the slurry is maintained between about 30% to 40% by weight. The $P_2O_5$ content of the liquid phase of the slurry is maintained between 25% and 32% by weight, and preferably between about 26% an 29% by weight. The nominal retention time in the set of attack tanks is between 5 and 18 hours, and preferably between 8 and 16 hours. The rate of sulfuric acid addition to the attack tanks is controlled so as to provide a free sulfuric acid content between about 0.5% and 4.0% and preferably between about 1.0% and 3.5% in the liquid phase of the slurry. The liquid phase of the slurry also contains other components, such as hydroflouric acid (HF), hydrochloric acid, dissolved iron and aluminum compounds, etc.

The most important factor in the practice of this invention is the addition of acid soluble (active) silica to the attack tanks so as to control the molar ratio of non-fluosilicate fluoride to aluminum in the liquid phase of the slurry in a range between 2.5 and 5.0, and preferably between 3.5 and 4.5. In the context of this patent application, the term "acid soluble (active) silica" designates an $SiO_2$-containing material from which at least 25% of its silica content can be readily solubilized upon contact with an HF-containing dilute phosphoric acid. Examples of acid soluble silica include diatomaceous earth, montmorillonite, attapulgite, wollastonite, kaolin, and the like. The preferred acid soluble silica used in the practice of this invention is diatomaceous earth, because of its high soluble silica and low alumina contents. Coarse sand, quartz and other $SiO_2$-containing materials which are not readily soluble in an HF-containing dilute phosphoric acid are not suitable in the practice of this invention, unless very finely ground. An experimental procedure for classifying an $SiO_2$-containing material as suitable for the practice of this invention is described in Example 2 hereinbelow.

The molar ratio of non-fluosilicate fluoride to aluminum in the liquid phase of the slurry can be readily calculated from analytically determined molar concentrations of total fluoride (F), silica (Si), and aluminum (Al) in the liquid phase of the slurry using the following expression: $(F - 6Si)/Al$. As is apparent from the foregoing expression, non-fluosilicate fluoride is defined as $(F - 6Si)$, where F is the total dissolved molar fluoride concentration and 6Si is the molar concentration of fluoride capable of being complexed in the form of the fluosilicate ion, $SiF_6^=$, by the dissolved silica content. Samples of the liquid phase of the slurry to be subjected to analyses for total fluoride, silica, and aluminum can be obtained periodically or continually from stream 13 or from any of the attack tanks, preferably the last tank of the set. Because of the intense circulation of the slurry within the set of attack tanks, the composition of the liquid phase of the slurry does not vary much from tank to tank and is essentially identical to the composition of the product acid. The molar $(F - 6Si)/Al$ ratio calculated from these analyses provides a basis for adjusting the rate of silica addition to the attack tanks via line 7.

Without silica addition, the molar $(F - 6Si)/Al$ ratio of phosphoric acid produced from phosphate rocks with a high aluminum content, such as the nonsedimentary rocks found in Sri Lanka, is usually below 2.5. A cursory look at the $(F - 6Si)/Al$ expression would suggest that the addition of acid soluble silica would simply reduce the value of the numerator, and would consequently reduce the molar $(F - 6Si)/Al$ ratio. Surprisingly, however, it has been found that as soluble silica is introduced at gradually increasing rates into the phosphate rock acidulation circuit, there is a concomitant increase in the molar $(F - 6Si)/Al$ ratio in the liquid phase of the acidulation slurry. In the practice of this invention, the rate of soluble silica addition required to bring the molar $(F - 6Si)/Al$ ratio within specified the 2.5 to 5.0 range is determined empirically for a given rock. Preferably, the rate of soluble silica addition should be between about 1 pound and 20 pounds per ton of phosphate rock fed into the acidulation circuit. The rate of silica addition to the attack tanks is preferably controlled so as to maintain the molar $(F - 6Si)/Al$ ratio in the liquid phase of the acidulation slurry in the 3.5 to 4.5 range.

It is believed that the acid soluble silica added to the attack tanks serves to complex an appropriate amount of fluoride as fluosilicic, $H_2SiF_6$, allowing the remaining fluoride to complex with dissolved aluminum to form $AlF_4^-$ in the acid phase and facilitating the crystallization of $Ca(AlF_4)_2.2H_2O$, which can be conveniently removed with the byproduct gypsum. As will be evident from Examples 1 and 2 hereinbelow, the aluminum content of the wet process phosphoric acid can be reduced by about 69% if the acid is produced with the addition of acid soluble silica in accordance with this invention.

The process of this invention is particulurily suitable for the processing of phosphate rocks with high iron and aluminum contents [i.e. $(Fe_2O_3 + Al_2O_3) > 3.5\%$ by weight], low magnesium contents (i.e. $<0.1\%$ MgO), and low silica contents (i.e. $<1.5\%$ $SiO_2$), such as the nonsedimentary rocks found in Sri Lanka. The application of conventional phosphoric acid production technology to such rock yields a phosphoric acid with an $(Fe_2O_3 + Al_2O_3)/P_2O_5$ ratio (by weight) greater than 0.085, i.e an acid which is not suitable for direct conversion to commercial grade DAP fertilizer. In contrast to prior art, the process of this invention yields a phosphoric acid with an acceptably low $(Fe_2O_3 + Al_2O_3)/P_2O_5$ weight ratio.

The process of this invention offers several distinct advantages over prior art. First, the removal of aluminum from phosphoric acid during acidulation, i.e. before filtration, does not require the additional equipment and processing steps associated with the removal of aluminum from phosphoric acid after filtration. Also, in contrast to prior art, the process of this invention generates an aluminum - containing precipitate which is readily removable from the phosphoric acid by filtration. Next, the process of this invention does not suffer from the $P_2O_5$ losses associated with some of the prior art methods. Finally, the process of this invention extends the utility of conventional dihydrate phosphoric acid production technology to the processing of nonsedimentary phosphate rocks having a high $Fe_2O_3$ and $Al_2O_3$ content.

EXAMPLES

Figure 2:
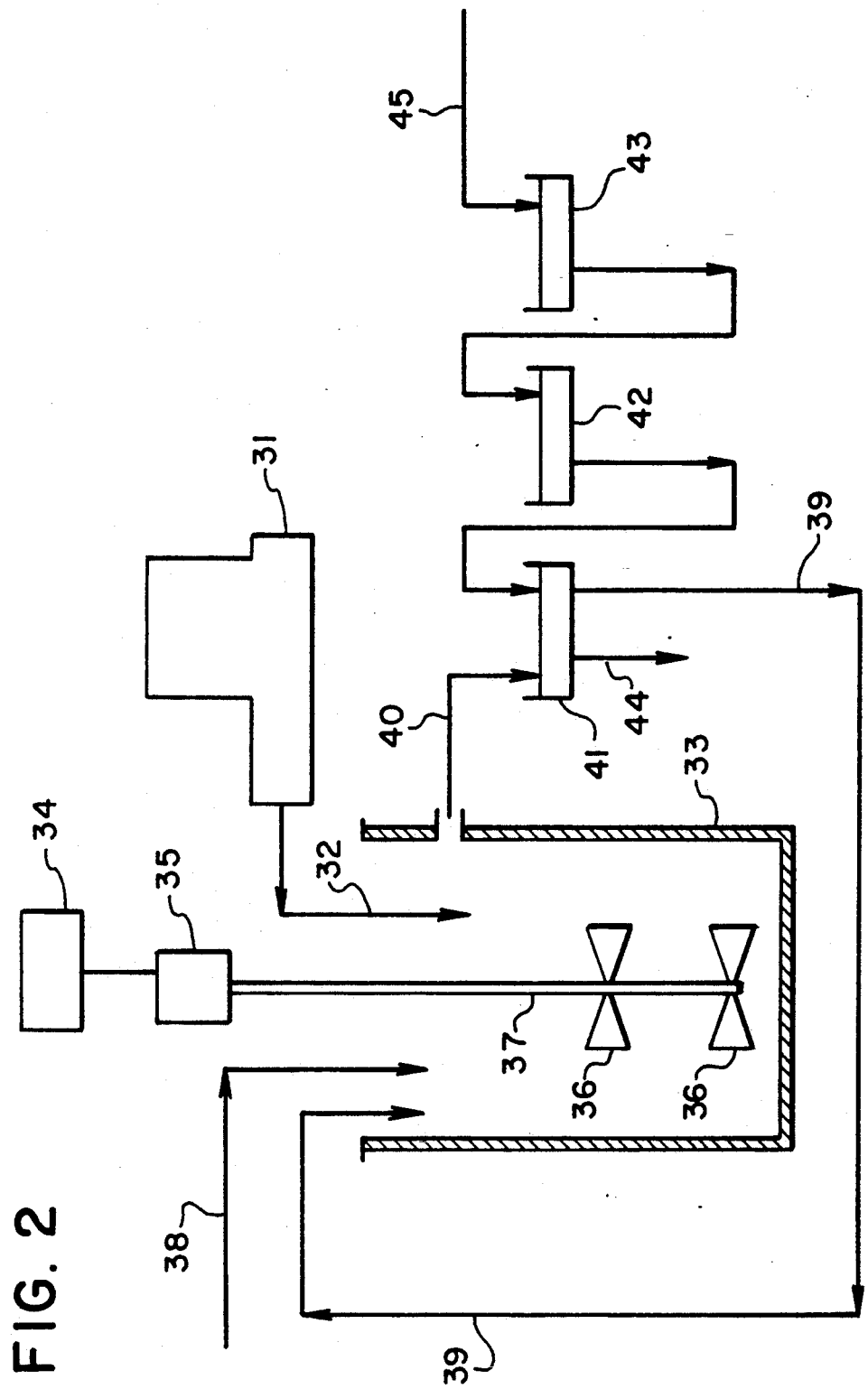
FIG. 2 is a flow diagram of the bench scale pilot equipment used in tests described in the examples hereinbelow.

Examples 1 and 2 represent phosphate rock acidulation tests conducted in bench scale pilot equipment arranged as shown in FIG. 2. The phosphate rock used in both tests came from the Eppawala deposit in Sri Lanka and had a composition as shown in Table 1.

TABLE 1

| Phosphate Rock Composition | |
|---|---|
| Component | % by weight |
| $P_2O_5$ | 37.82 |
| CaO | 51.00 |
| $Fe_2O_3$ | 3.35 |
| $Al_2O_3$ | 1.22 |
| MgO | 0.046 |
| $Na_2O$ | 0.093 |
| $K_2O$ | 0.005 |
| F | 2.85 |
| Cl | 1.10 |
| $CO_2$ | 1.05 |
| $SiO_2$ | 0.96 |
| $H_2O$ | 0.70 |

It should be noted that this phosphate rock has a high iron and aluminum content [(Fe$_2$O$_3$+Al$_2$O$_3$)=4.57%], a low magnesium content (0.046% MgO), and a low silica content (0.96% SiO$_2$).

EXAMPLE 1—COMPARATIVE EXAMPLE

Comparative Example 1 serves to illustrate the results of phosphate rock acidulation performed on the Sri Lanka phosphate rock without the benefit of controlling the (F - 6Si)Al ratio in accordance with the method of this invention.

Refering to FIG. 2, phosphate rock was fed using a screw feeder 31 via line 32 into acidulation tank 33 which was equipped with controller 34, stirrer 35, and impellers 36 mounted on shaft 37. The acidulation tank 33 was constructed of ¼ inch thick stainless steel; the tank was 14 inches high, had a diameter of 9 inches, and a working volume of 10.2 liters. The tank was equipped with four 1-inch baffles (not shown) and was completely rubber-lined. The outer surface of the tank was heat-taped and insulated. The impellers 36 and shaft 37 were machined from corrosion resistant alloys. The acidulation tank 33 was also fed via line 38 with sulfuric acid and via line 39 with recycle phosphoric acid. The acidulation slurry exiting tank 33 was fed via line 40 onto the first of three vacuum filters 41, 42 and 43. Each of the three filters was 5 inches in diameter and was equipped with a monofilament polypropylene filter cloth. The filtrate resulting from the filtration of the acidulation slurry was the product phosphoric acid 44. Residual phosphoric acid retained with the moist filter cake was recovered via line 39 as recycle phosphoric acid using three-stage countercurrent washing with water which was fed onto filter 43 via line 45. The filtration equipment served not only to wash the filter cake and to generate the recycle acid, but also facilitated the measuring of filtration rates.

The pilot scale unit described hereinabove was operated for a period of about 48 hours. Feed stream flowrates were set so as to provide a nominal retention time of about 6 hours in the acidulation tank. The operating conditions were maintained in the ranges shown in Table 2.

TABLE 2

| Operating Conditions | |
|---|---|
| Acidulation Temperature, °C. | 70 to 80 |
| Acidulation Slurry Gravity at 75° C. | 1.50 to 1.55 |
| Product Phosphoric Acid Gravity at 25° C. | 1.32 to 1.34 |
| Solids in Acidulation Slurry, % | 30 to 35 |
| P$_2$O$_5$ Content of Product Phosphoric Acid, % | 26 to 29 |
| H$_2$SO$_4$ Content of Product Phosphoric Acid, % | 2.5 to 3.0 |

As already stated, no attempt was made in Comparative Example 1 to control the molar (F - 6Si)/Al ratio in accordance with the method of this invention. The composition of the phosphoric acid and of the filter cake obtained in this example are shown in Table 3.

TABLE 3

| Component | % |
|---|---|
| Composition of Acid Produced in Example 1 | |
| P$_2$O$_5$ | 27.6 |
| H$_2$SO$_4$ | 2.99 |
| Fe$_2$O$_3$ | 1.63 |
| Al$_2$O$_3$ (Al) | 0.85 (0.45) |
| F | 1.76 |
| Cl | 0.63 |
| SiO$_2$ (Si) | 0.73 (0.34) |
| Gypsum Filter Cake | |

TABLE 3-continued

| Component | % |
|---|---|
| P$_2$O$_5$ | 0.87 |
| Al$_2$O$_3$ | 0.077 |
| F | 0.31 |

Note that the molar (F - 6Si)/Al ratio of this acid is [1.76/19 - 6(0.34)/28]/0.45/27 = 1.19, wherein the values 19, 28, and 27 represent the approximate atomic weights of F, Si, and Al, respectively. The molar (F - 6Si)/Al ratio of 1.19 in the phosphoric acid product is well outside the range of 2.5 to 5.0 specified by the method of this invention. The aluminum content of the acid is 0.85% Al$_2$O$_3$, and its (Fe$_2$O$_3$+Al$_2$O$_3$)/P$_2$O$_5$ ratio is 0.0899. Consequently, this acid is not suitable for the production of 18-46-0 DAP.

An x-ray diffraction analysis of the filter cake generated in Comparative Example 1 indicated that gypsum is its predominant component; calcium tetrafluoaluminate dihydrate was not detected.

EXAMPLE 2—EXAMPLE OF THE INVENTION

Example 2 serves to illustrate the invention by showing the results of phosphate rock acidulation performed on the Sri Lanka phosphate rock with the benifits derived from controlling the molar (F - 6Si)/Al ratio in accordance with the method of this invention.

The pilot scale equipment illustrated in FIG. 2 was operated essentially as described hereinabove under Comparative Example 1, with the modification that acid soluble silica was fed (in addition to the other feed streams identified in Comparative Example 1) into acidulation tank 33 at a rate which controlled the molar (F - 6Si)/Al ratio in the liquid phase of the acidulation slurry between 3.5 and 4.5. The acid soluble silica employed in this example was diatomaceous earth. The rate of diatomaceous earth addition was equivalent to 0.1% of the rate at which phosphate rock was fed into the acidulation tank. This corresponds to about 2 pounds of diatomaceous earth per ton of phosphate rock.

The procedure for classifying the diatomaceous earth as suitable for the practice of this invention involved adding 5 grams of the material to 1 liter of an aqeous solution containing 30% P$_2$O$_5$ and 3% HF at 75° C., and stirring this mixture at that temperature for 2 hours in a rubber lined vessel equipped with a reflux condenser. The mixture was then filtered, and conventional analytical methodology was employed to determine the extent of silica solubilization. To be useful in the practice of this invention, a material should contain at least 25% SiO$_2$ which dissolves in the aqeous solution under the conditions of this classification procedure. In the context of this patent specification, materials meeting this requirement are referred to as acid soluble silicas or active silicas. The diatomaceous earth used in Example 2 contained about 85% silica which dissolved in the aqeous solution used in the classification procedure.

The composition of the phosphoric acid and of the washed filter cake obtained in Example 2 is shown in Table 4. The filtration rates were improved significantly by the use of acid soluble silica in Example 2.

TABLE 4

| Component | % |
|---|---|
| Composition of Acid Produced in Example 2 | |
| P$_2$O$_5$ | 27.8 |

TABLE 4-continued

| Component | % |
|---|---|
| $H_2SO_4$ | 2.95 |
| $Fe_2O_3$ | 1.73 |
| $Al_2O_3$ (Al) | 0.26 (0.14) |
| F | 1.08 |
| Cl | 0.55 |
| $SiO_2$ (Si) | 0.38 (0.18) |
| Filter Cake | |
| $P_2O_5$ | 0.53 |
| $Al_2O_3$ | 0.33 |
| F | 0.56 |

Note that the molar (F - 6Si)/Al ratio of the acid produced in Example 2 is 3.52, i.e. [1.08/19 - 6(0.18)/28]/0.14/27 = 3.52. This acid has a level of aluminum contamination (0.26% $Al_2O_3$) which is about 69% lower than that of the acid produced in Comparative Example 1 which contained 0.85% $Al_2O_3$, illustrating the effectiveness of this invention in the removal of aluminum contamination from phosphoric acid during the acidulation of phosphate rock. Also, the ($Fe_2O_3$+$Al_2O_3$)/$P_2O_5$ weight ratio of the acid produced in Example 2 is 0.0716, which is significantly lower than the corresponding value 0.0899 for the acid produced in Comparative Example 1 and well below 0.085, as needed to render the acid produced in Example 2 suitable for ammoniation and conversion to diammonium phosphate (DAP) which meets commercial specifications for nitrogen and phosphate content. By virtue of its lower metal impurity content, the acid produced in Example 2 is also less prone to exhibit post-precipitation and sludge formation phenomena which plague acids with higher levels of aluminum contamination. It should be noted that even the level of silica contamination is lower in the acid produced in Example 2, notwithstanding the fact that acid - soluble silica was fed to the acidulation tank in this example.

An x-ray diffraction analysis of the washed filter cake generated in Example 2 revealed the presence of gypsum, $CaSO_4.2H_2O$, as well as calcium tetrafluoroaluminate dihydrate, $Ca(AlF_4)_2.2H_2O$. In comparison to Comparative Example 1, the washed filter cake generated in Example 2 had higher aluminum and fluoride contents and a lower $P_2O_5$ content, indicating that better impurity rejection and better $P_2O_5$ recovery were attained when soluble silica was used to control the molar (F - 6Si)/Al ratio in accordance with this invention.

What is claimed is:

1. A method for the removal of aluminum contamination from phosphoric acid during the acidulation of phosphate rock with sulfuric acid comprising forming an acidulation slurry of the phosphate rock in sulfuric acid and recycled phosphoric acid and adding sufficient acid soluble silica to the acidulation slurry to maintain the molar ratio of non-fluosilicate fluoride to aluminum in the liquid phase of the acidulation slurry between 2.5 and 5.0 to remove said aluminum contamination from said liquid phase by precipitation of calcium tetrafluoroaluminate dihydrate, $Ca(AlF_4)_2.2H_2O$.

2. The method of claim 1 wherein said liquid phase of the slurry has a $P_2O_5$ content between 25% and 32% by weight and is recovered by filtration as a dilute phosphoric acid.

3. The method of claim 1 wherein said acidulation is conducted at a temperature between about 60° and 85° C.

4. The method of claim 1 wherein said acidulation is conducted for a period of time ranging between about 5 hours and 18 hours.

5. The method of claim 1 wherein said acid soluble silica is added in an amount between about 1.0 pound and 20 pounds per ton of phosphate rock being acidulated.

6. The method of claim 1 wherein said acid soluble silica is diatomaceous earth.

7. The method of claim 1 wherein said molar ratio of non-fluosilicate fluoride to aluminum in the liquid phase of the acidulation slurry is maintained between 3.5 and 4.5.

8. The method of claim 1 wherein said phosphate rock has a combined $Fe_2O_3$ and $Al_2O_3$ content in excess of 3.5% by weight.

9. The method of claim 1 wherein said phosphate rock is the nonsedimentary phosphate rock occurring in Sri Lanka.

10. The method of claim 1 wherein said liquid phase of the acidulation slurry has an ($Fe_2O_3$+$Al_2O_3$)/$P_2O_5$ weight ratio of less than 0.085.

11. A process for acidulating phosphate rock to produce phosphoric acid having reduced aluminum content comprising the steps of:
  a. feeding phosphate rock, sulfuric acid, recycle phosphoric acid, and acid soluble silica into a set of attack tanks, thereby acidulating said phosphate rock and effecting the dissolution of its phosphate content;
  b. maintaining the molar ratio of non-fluosilicate fluoride to aluminum in the liquid phase of the acidulation slurry formed in step (a.) between 2.5 and 5.0, thereby precipitating aluminum from the liquid phosphoric acid phase during the acidulation of phosphate rock;
  c. subjecting the acidulation slurry from step (b.) to filtration;
  d. recovering a liquid phosphoric acid phase from filtration step (c.);
  e. washing the filter cake from step (c.) with water to generate recycle phosphoric acid for return to step (a.), and
  f. recycling said recycle phosphoric acid to the attack tanks in step (a.).

12. The process of claim 11 wherein the set of attack tanks comprises a single tank.

13. The process of claim 11 wherein the set of attack tanks comprises a series of up to ten tanks.

14. The process of claim 11 wherein the set of attack tanks comprises nine tanks.

15. The process of claim 11 wherein said washed filter cake from step (e.) contains gypsum, $CaSO_4.2H_2O$, and calcium tetrafluoroaluminate dihydrate, $Ca(AlF_4)_2.2H_2O$.

16. In the dihyrate process for the production of phosphoric acid wherein phosphate rock is acidulated with sulfuric acid in the presence of recycled phosphoric acid in an acidulation slurry having a liquid phase which has a $P_2O_5$ content of between about 25 to 32% by weight, the improvement comprising removing aluminum contamination from the liquid phase of the acidulation slurry during said acidulation of phosphate rock, said aluminum contamination being removed by the addition of acid soluble silica to the acidulation slurry to maintain the molar ratio of non-fluosilicate fluoride to aluminum in the liquid phase of the acidulation slurry between 2.5 and 5.0.

17. The process of claim 16 wherein said aluminum contamination is removed by precipitation of calcium tetrafluoaluminate dihydrate, $Ca(AlF_4)_2 \cdot 2H_2O$ from the acidulation slurry.

18. The process of claim 16 wherein said acid soluble silica is added in an amount between 1.0 pound and 20 pounds per ton of phosphate rock being acidulated.

19. The process of claim 16 wherein said molar ratio of non-fluosilicate fluoride to aluminum in the liquid phase of the acidulation slurry is maintained between 3.5 and 4.5.

20. The process of claim 16 wherein said phosphate rock has a combined $Fe_2O_3$ and $Al_2O_3$ content in excess of 3.5% by weight.

21. The process of claim 16 wherein said phosphate rock is the nonsedimentary phosphate rock occurring in Sri Lanka.

22. The process of claim 16 wherein said liquid phase of the acidulation slurry has ar $(Fe_2O_3+Al_2O_3)/P_2O_5$ weight ratio of less than 0.085.

23. The process of claim 16 wherein said acidulation slurry is filtered to recover its phosphoric acid liquid phase.

* * * * *